(12) United States Patent
Sirven

(10) Patent No.: US 7,234,576 B2
(45) Date of Patent: Jun. 26, 2007

(54) DAMPER, IN PARTICULAR FOR MOTOR VEHICLE

(76) Inventor: Jacques Sirven, 34 Rue de l'Orangerie, Versailles (FR) 78000

( * ) Notice: Subject to any disclaimer, the term of this patent is extended or adjusted under 35 U.S.C. 154(b) by 96 days.

(21) Appl. No.: 10/510,149

(22) PCT Filed: Mar. 28, 2003

(86) PCT No.: PCT/FR03/00979

§ 371 (c)(1),
(2), (4) Date: Oct. 5, 2004

(87) PCT Pub. No.: WO03/085283

PCT Pub. Date: Oct. 16, 2003

(65) Prior Publication Data

US 2005/0167940 A1    Aug. 4, 2005

(30) Foreign Application Priority Data

Apr. 5, 2002    (FR)    .................... 02 04298

(51) Int. Cl.
F16F 9/06    (2006.01)
F16F 9/34    (2006.01)
(52) U.S. Cl. .................. 188/314; 188/322.15
(58) Field of Classification Search .......... 188/282.1, 188/313, 314, 315, 322.14, 322.15, 266.6, 188/318, 322.13
See application file for complete search history.

(56) References Cited

U.S. PATENT DOCUMENTS

| | | | |
|---|---|---|---|
| 3,492,013 A | | 1/1970 | Osbon et al. |
| 4,711,435 A | | 12/1987 | Benyon et al. |
| 5,123,506 A | * | 6/1992 | Sirven .................. 188/280 |
| 5,143,185 A | * | 9/1992 | Klein et al. ............ 188/322.14 |
| 5,586,627 A | * | 12/1996 | Nezu et al. .................. 188/318 |
| 5,588,510 A | * | 12/1996 | Wilke .......................... 188/314 |

(Continued)

FOREIGN PATENT DOCUMENTS

DE    30 42 951    7/1982

(Continued)

OTHER PUBLICATIONS

Patent Abstracts of Japan vol. 2000, No. 18, Jun. 5, 2001—& JP 09 151980 A (Oehlins Racing AB; Yamaha Motor Co Ltd) Jun. 10, 1997 abstract.

(Continued)

*Primary Examiner*—Thomas Williams
(74) *Attorney, Agent, or Firm*—Young & Thompson

(57) ABSTRACT

A damper, in particular for motor vehicle, includes a cylinder containing a hydraulic fluid, a main piston (1) actuated by a rod (3) defining in the cylinder a first chamber (2a) and a second chamber (2), the second chamber containing the rod, a hydraulic fluid reservoir (6) and a valve (10) placed in the hydraulic fluid flow between the first chamber and the second chamber, the valve including a mobile check valve (28) co-operating with a seat (30) and elements designed to press the check valve on its seat. The damper further includes filtering elements mounted (16) in parallel with the valve (10), adapted to generate a filtering control pressure acting on the check valve, the control pressure depending on the pressure differential at the inlet and the outlet of the valve.

14 Claims, 13 Drawing Sheets

U.S. PATENT DOCUMENTS 6,817,454 B2 * 11/2004 Nezu et al. ............ 188/322.15

FOREIGN PATENT DOCUMENTS

| EP | 0 416 987 | 3/1991 |
| EP | 0 942 195 | 9/1999 |
| FR | 2 268 208 | 11/1975 |
| GB | 2 218 677 | 11/1989 |
| WO | WO 00 69664 | 11/2000 |

OTHER PUBLICATIONS

Patent Abstracts of Japan vol. 1997, No. 02, Feb. 28, 1997—& JP 08 260747 A (Kayaba Ind Co Ltd), Oct. 8, 1996 abstract.

* cited by examiner

DAMPER, IN PARTICULAR FOR MOTOR VEHICLE

The subject of the present invention is a damper, in particular for motor vehicles, comprising a control valve placed in the hydraulic fluid flow path upon compression movements of the damper.

A hydraulic damper, used in particular in a motor vehicle, normally comprises a cylinder filled with hydraulic fluid, inside which a main piston actuated by a stem can move. The piston defines in the cylinder a first chamber and a second chamber containing the stem. When the piston moves inside the cylinder, the submerged volume of the stem varies, which leads to a variation in the volume available for the oil inside the cylinder. A hydraulic fluid reservoir is therefore connected to the cylinder to compensate for these variations.

To generate a hydraulic force opposing the movement of the suspension, in particular upon a compression movement during which the stem penetrates into the cylinder, the oil discharged by the main piston is passed through restrictions which can be of different types. It is possible to use simple calibrated orifices, leaf valves made of foil or light metallic parts, or even relatively heavy control valves, normally comprising a valve element pressed against a seat, as described for example in European patent application A-0 416 987 (SIRVEN).

In this type of damper comprising a control valve with a valve element, the pressure drop generated by the passage of an oil flow through the valve results, at constant flow, in a pressure drop which oscillates around an average value. The use of this type of control valve makes it easy to vary the force designed to close the valve element and therefore the damping force created by the damper to adapt it to external parameters, such as the state of the road on which the vehicle is moving. However, the oscillations in the pressure drop through the valve cause an instability in the operation of such dampers.

In a known type of damper, as described in the aforementioned European patent application, when the valve is successfully stabilized by appropriate means, oscillations in the damping force linked to a spurious coupling of the damper and the elastic elements that link it to the chassis of the vehicle and the wheel are also observed when the damping law is such that the pressure decreases when the flow rate passing through the valve increases.

More generally, when using such dampers of known type, percussion effects transmitted to the structure of the vehicle on passing over small-sized obstacles are observed when the chosen damping law is such that the damping force decreases when the compression speed increases.

Finally, difficulties are also observed on switching from the decompression mode of operation to a compression mode of operation of the damper, these faults probably being due to a delay in closing the control valve.

The subject of the present invention is a damper comprising additional means designed to eliminate the drawbacks of dampers of known type.

The subject of the invention is in particular a damper wherein the difficulties resulting from the oscillations in the damping force are considerably reduced, or even totally eliminated.

The subject of the invention is also such a damper, with which the percussion effects encountered on passing over small-sized obstacles are eliminated.

The subject of the present invention is also the use of such dampers on a motor vehicle, to improve the road handling of the vehicle.

In the present description, the terms "inlet" and "outlet", and the concepts of "upstream" and "downstream" will be considered in a compression movement of the damper during which the stem penetrates into the cylinder of the damper. It will be understood that these terms and definitions should be reversed in the case of a reverse decompression movement of the damper.

The damper according to the invention, in particular for motor vehicles, comprises a cylinder containing a hydraulic fluid, a main piston actuated by a stem defining in the cylinder a first chamber and a second chamber, said second chamber containing the stem, a hydraulic fluid reservoir and a valve placed in the hydraulic fluid flow between the first chamber and the second chamber. The valve comprises a movable valve element cooperating with a seat and means designed to press the valve element onto its seat. Filtering means are mounted in parallel with the valve and are adapted to generate a filtering control pressure acting on the valve element of the valve, the control pressure depending on the pressure differential at the inlet and at the outlet of the valve.

In this way, the filtering means mounted in parallel with the valve are not passed through by the main fluid flow upon a compression movement of the damper, since this flow passes only through the valve. Conversely, the pressure differential at the inlet of the valve and at its outlet or, which amounts to the same thing, the pressure variation between the first and the second chambers of the cylinder of the damper, is used to generate, by filtering means, a control pressure acting on the valve element. This control pressure thus represents the differential coefficient of the abovementioned pressure differential.

The filtering means convey a flow with a very low flow rate, sufficient in the compression phase of the damper, to generate the desired control pressure.

The percussion effects due to small-sized obstacles, encountered in dampers of known type in which the damping force is compelled to decrease on an increase in the compression speed, are thus filtered.

It is understood that it is the variation in the compression force which induces a flow rate in the filtering means generating the control pressure.

In one application of the damper of the invention to a motor vehicle, it becomes possible, by an appropriate variation of the time constants of the filtering means equipping the dampers of the front axle compared to the dampers of the rear axle, to modify the roadholding behavior of the vehicle.

In an advantageous embodiment, the filtering means comprise: a balancing chamber divided into two parts by a movable piston, the two parts of the balancing chamber being respectively linked by pipes, on the one hand to the inlet of the valve, itself linked to the first chamber of the cylinder and on the other hand to the outlet of the valve, itself linked to the second chamber of the cylinder and to the reservoir. The movable piston is subject to the action of a balancing spring means which can comprise a single spring or, preferably, two springs, each exerting a compression force on one of the surfaces of the movable piston.

A filtering restriction is mounted in the pipe linking one of the parts of the balancing chamber to the valve. A filtering pipe also links said part of the balancing chamber to the valve, in order to apply the filtering control pressure prevailing in said part of the balancing chamber to the movable valve element of the valve.

The spring means is used to balance the pressure differentials at the inlet and at the outlet of the valve in the absence of flow rate passing through the filtering means.

If the pressure differential varies between the inlet and the outlet of the valve, the filtering restriction generates a control pressure which is transmitted to the valve via the filtering pipe.

When two springs are used, it becomes possible to obtain a linear characteristic for the force created by the springs.

The movable valve element of the valve is normally subject to a closing force designed to press the valve element onto its seat.

The closing force can, for example, be generated by a spring.

In another embodiment, the closing force is generated by a hydraulic pressure differential created by a restriction mounted upstream or downstream of the control valve.

The combination of a spring with a hydraulic pressure differential can also be provided.

The movable valve element can also be subject to a force designed to open it at the high displacement speeds of the damper stem. This force can advantageously be generated by a pressure differential created by a restriction mounted downstream or upstream of the control valve.

In a first embodiment of the invention, the valve comprises a control chamber linked at the inlet, adjacent the seat of the movable valve element, to the first chamber of the cylinder, and linked at the outlet to the second chamber of the cylinder and also receiving the filtering pressure.

The movable valve element comprises a valve element head capable of cooperating with the seat, a valve element stem and a valve element piston integral with the stem at the opposite end from the valve element head. A regulation cylinder is housed inside the control chamber and defines a first closed regulation chamber, inside which the valve element piston slides.

Advantageously, the regulation cylinder defines a second closed regulation chamber containing the valve element stem.

According to a preferred variant, the valve element stem has a through passage connecting the seat of the valve element with one of the regulation chambers.

According to a first variant, the filtering restriction is mounted in the pipe linking that part of the balancing chamber linked to the inlet of the valve and to the first chamber of the cylinder, whereas the balancing pipe is linked to the first regulation chamber.

According to a second variant, the filtering restriction is mounted in the pipe linking that part of the balancing chamber linked to the outlet of the valve and to the second chamber of the cylinder, whereas the balancing pipe is linked to the second regulation chamber.

In another embodiment, the through passage connects the seat of the valve element with the first regulation chamber and the regulation cylinder defines a third and a fourth regulation chamber containing the valve element stem, the valve element comprising an auxiliary piston separating said third and fourth regulation chambers.

In another embodiment, the through passage connects the seat of the valve element with the first regulation chamber and the regulation cylinder defines a third and a fourth regulation chamber containing the valve element stem. A sleeve forming an auxiliary piston is mounted sliding along the stem of the valve element. The auxiliary piston separates said third and fourth regulation chambers and the sliding sleeve presses on the valve element head through the intermediary of a spring link.

In this way, the spring can generate a delay on opening the valve.

Said third and fourth regulation chambers are advantageously subject respectively to the pressure downstream and upstream of the restriction mounted on the outlet pipe of the valve.

According to a variant, the stem comprises a shoulder in the third chamber.

Said third and fourth regulation chambers can, in this case, be respectively subject to the pressure downstream of the restriction mounted on the outlet pipe of the valve toward the second chamber of the cylinder and to the pressure downstream of a restriction mounted on the outlet pipe of the valve toward the reservoir.

The invention will be better understood by studying the detailed description of a few embodiments illustrated by the appended drawings, in which:

FIG. 1 diagrammatically represents the main component parts of a damper according to the invention, in accordance with a first embodiment;

FIG. 2 diagrammatically represents the main component parts of a first variant of the first embodiment;

FIG. 3 diagrammatically represents the main component parts of a second variant of the first embodiment;

FIG. 4 diagrammatically represents the main component parts of a third variant of the first embodiment;

FIG. 5 diagrammatically represents the main component parts of a damper according to the invention, in accordance with a second embodiment;

FIG. 6 diagrammatically represents the main component parts of a first variant of the second embodiment;

FIG. 7 diagrammatically represents the main component parts of a second variant of the second embodiment;

FIG. 8 diagrammatically represents the main component parts of a third variant of the second embodiment;

FIG. 9 diagrammatically represents the main component parts of a third embodiment of a damper according to the invention;

FIG. 10 diagrammatically represents the main component parts of a variant of the third embodiment;

Figure 1:
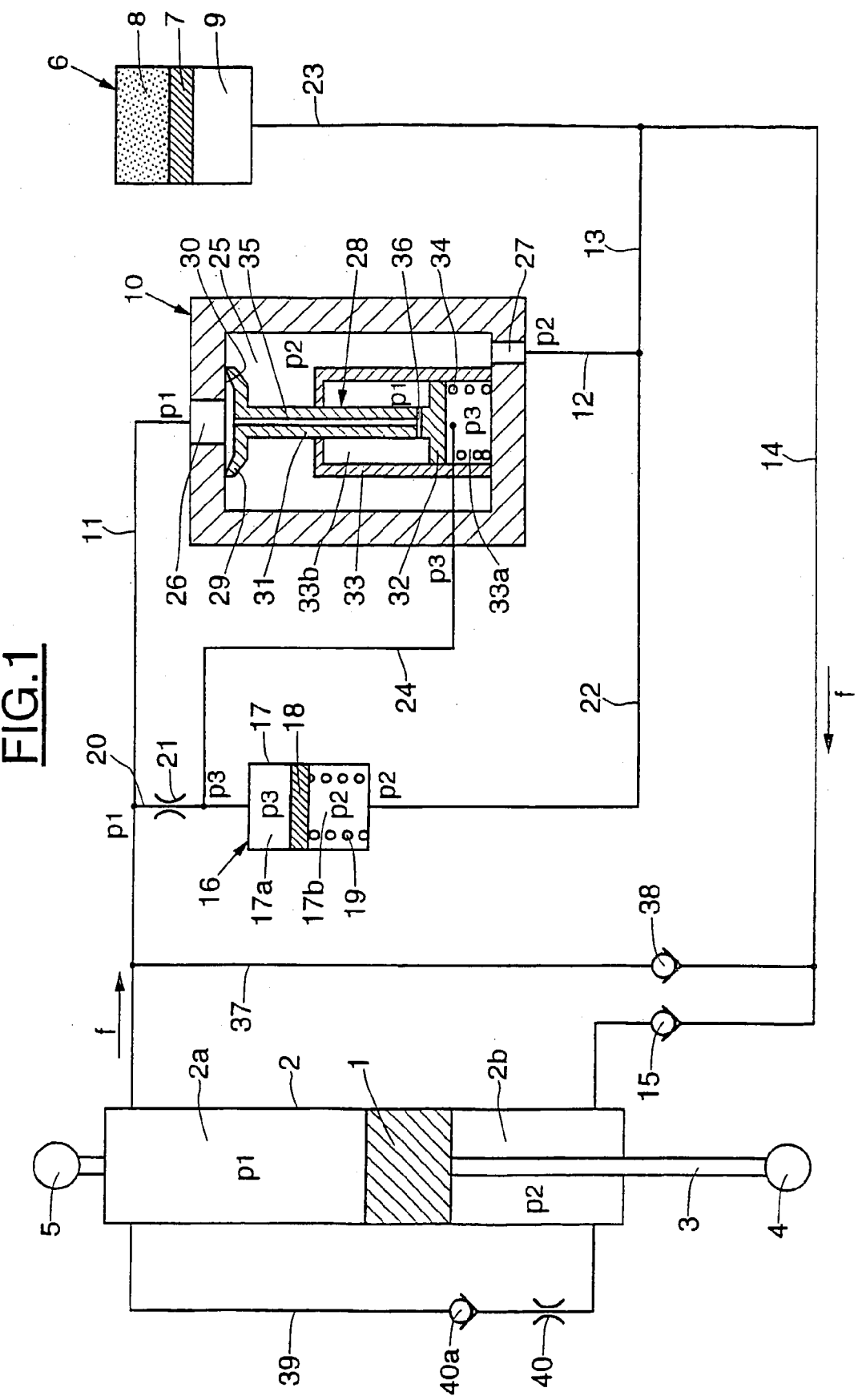

As is illustrated in FIG. 1, according to a first embodiment, the damper according to the invention, which can be used in particular for a motor vehicle suspension, comprises a main piston 1 which can slide inside a cylinder 2 and defines within the latter a first chamber 2a at the bottom end of the piston 1, and a second chamber 2b which encloses the stem 3 integral with the piston 1. At its free end, the stem 3 has an attachment ring 4 which can be linked to the wheel of the motor vehicle. At the opposite end, the cylinder 2 is closed and comprises an attachment element 5 which can be permanently linked to the body of the vehicle. The two chambers 2a and 2b of the cylinder 2 are filled with a hydraulic fluid such as oil.

The damper assembly is complemented by a reservoir 6 which comprises a floating piston 7 separating the top part 8 of the reservoir 6 which is filled with a gas from the bottom part 9 filled with hydraulic fluid.

A valve 10 is placed in the hydraulic fluid flow between the first chamber 2a and the second chamber 2b.

The valve 10 is in practice linked to the first chamber 2a by the pipe 11 and to the second chamber 2b by the pipes 12, 13 and 14, via a nonreturn valve 15 which allows a hydraulic fluid flow toward the second chamber 2b and prevents it in the other direction.

Filtering means 16 are mounted in the hydraulic circuit in parallel with the valve 10. The filtering means 16 comprise a balancing chamber 17 separated into two parts 17a, 17b by a movable piston 18 subject to the action of a balancing spring 19 placed in the part 17b of the balancing chamber.

The first part 17a of the balancing chamber is linked by the pipe 20 and the pipe 11 to the inlet of the valve 10, itself linked to the first chamber 2a of the cylinder 2. A filtering restriction 21 included in the filtering means 16, is mounted in the pipe 20.

The second part of the balancing chamber 17b is linked by the pipe 22 and the pipe 12 to the outlet of the valve 10, itself linked to the second chamber 2b of the cylinder 2 by the pipes 13 and 14, and to the reservoir 6 by the pipe 23.

A filtering pipe 24 links the first part 17a of the balancing chamber to the valve 10.

The valve 10 comprises a control chamber 25 which has an inlet orifice 26 receiving the hydraulic fluid flow originating from the first chamber 2a of the cylinder 2 via the pipe 11, upon a compression movement exerted on the damper, in other words a movement pressing the main piston 1 into the cylinder 2.

The control chamber 25 has an outlet orifice 27 through which the hydraulic fluid flows to return mainly to the second chamber 2b via the pipes 12, 13 and 14, passing through the nonreturn valve 15 on such a compression movement. A proportion of the hydraulic fluid corresponding to the additional submerged volume of the stem 3, is furthermore directed to the reservoir 6 via the pipes 12, 13 and 23.

A movable valve element 28, which comprises a valve element head 29 able to cooperate with a seat 30 defined near to the inlet 26 of the control chamber 25 is mounted inside the control chamber 25 of the valve 10. The movable valve element 28 also comprises a valve element stem 31 and a valve element piston 32 integral with the stem 31 and positioned at the end opposite from the valve element head 29. The cross section of the valve element piston 32 is less than that of the valve element head 29.

Inside the control chamber 25, there is a closed part acting as a regulation cylinder 33. The valve element piston 32 slides inside this cylinder 33. The valve element piston 32 defines, inside the regulation cylinder 33, a first closed regulation chamber 33a and a second regulation chamber 33b, also closed, containing the valve element stem 31. A spring 34, positioned inside the first regulation chamber 33a, acts against the valve element piston 32 in the direction which is designed to close the valve 10, in other words, to press the valve element head 29 on its seat 30.

The valve element stem 31 has a through passage 35 which connects the external surface of the valve element head 29, adjacent the seat 30, with the second regulation chamber 33b through the intermediary of a transverse hole 36.

The assembly is complemented by a pipe 37 comprising a nonreturn valve 38, which can connect the reservoir 6 through the intermediary of the pipes 23 and 14 with the first chamber 2a of the cylinder 2 via the pipe 11.

Finally, appropriate means are provided to return the hydraulic fluid from the second chamber 2b to the first chamber 2a of the cylinder 2 on a decompression movement corresponding to an extraction movement of the main piston 1. To this end, a pipe 39 comprising a restriction 40 and a nonreturn valve 40a is linked, on the one hand, to the second chamber 2b and, on the other hand, to the first chamber 2a, in order to allow a flow of hydraulic fluid from the second chamber 2b to the first chamber 2a and prevent it in the reverse direction.

The assembly of damper parts operates as follows, upon a compression movement corresponding to pressing of the main piston 1 and of the stem 3 into the cylinder 2.

The pressure of the hydraulic fluid inside the first chamber 2a of the cylinder 2 is denoted $p_1$, and the pressure prevailing in the second chamber 2b of the cylinder 2 is denoted $p_2$.

Upon a compression movement, the hydraulic fluid flows from the first chamber 2a in the pipe 11 in the direction indicated by the arrow f. The pressure $p_1$ is exerted at the inlet of the control valve 10, and on the external surface of the valve element head 29. The pressure of the hydraulic fluid in the pipe 12 at the outlet of the control valve 10 is the pressure $p_2$. The pressure of the hydraulic fluid inside the control chamber 25 is therefore also $p_2$. This same pressure $P_2$ prevails inside the second balancing chamber 17b. Under the action of the pressure $p_1$, exerted on the valve element head 29, the movable valve element 28 can be opened so that a flow of hydraulic fluid passes through the control valve 10 to return to the second chamber 2b.

As long as the pressure differential $p_1-p_2$ between the inlet and the outlet of the control valve 10 remains constant, it is understood that no fluid flow passes through the restriction 21 which is part of the filtering means 16 and which is linked to the balancing chamber 17, given that the filtering means 16 are mounted in parallel on the valve 10. Furthermore, in the absence of flow through the restriction 21, the pressure $p_1$ prevails in the first balancing chamber 17a. The spring 19 balances the pressure differential $p_1-p_2$ between the two balancing chambers 17a and 17b.

Conversely, when the pressure differential $p_1-p_2$ between the inlet and the outlet of the control valve 10 varies, the result is a low hydraulic fluid flow passing through the restriction 21, which then defines, downstream of this restriction, a control pressure $p_3$ which is exerted in the first part 17a of the balancing chamber 17. This control pressure is directed by the pipe 24 into the first regulation chamber 33a.

The result is that the valve element piston 32 is subject on one side to the control pressure $p_3$ and on the other side to the pressure $p_1$ because of the existence of the through passage 35, 36.

S denotes the bearing section of the valve element head 29 and s denotes the total cross section of the valve element piston 32, s being less than S, $s_1$ is the cross section of the valve element stem 31. If F is the force exerted on the valve element piston 32 by the spring 34, the balancing equation of the valve element 28 can be expressed:

$$F = p_1 S - p_2(S-s_t) + p_1(s-s_t) - p_3 s \qquad (1)$$

which can be transformed to:

$$F = (p_1-p_2)(S-s_t) + (p_1-p_3)s \qquad (2)$$

The force F is designed to press the valve element 28 onto its seat 30 and thus defines the damping law of the damper.

The variation in the compression force induces a hydraulic fluid flow in the filtering means 16 which is proportional to the variation or to the differential coefficient of the pressure differential $p_1-p_2$, generating a control pressure $p_3$ which is exerted on the movable valve element 28 of the control valve 10. The result is thus a filtering effect regulating the pressure differential $p_1-p_2$ and filtering the high frequencies exerted on the damper.

The control valve 10 is thus driven according to the variations in the speed at which the stem 3 is pressed into the cylinder 2.

On a reverse movement, in other words a decompression movement, for which the main piston 1 and the stem 3 are extracted from the cylinder 2, the hydraulic fluid flows through the pipe 39 from the second chamber 2b to the first chamber 2a. The refilling of the hydraulic fluid from the reservoir 6 to offset the reduced volume of the stem 3 inside the cylinder 2 is achieved through the pipe 37 passing through the nonreturn valve 38. The pressure of the refilling hydraulic fluid is also exerted in the second part 17b of the filtering chamber 17, in order to return the piston 18 to its original position during the decompression phase.

Figure 2:
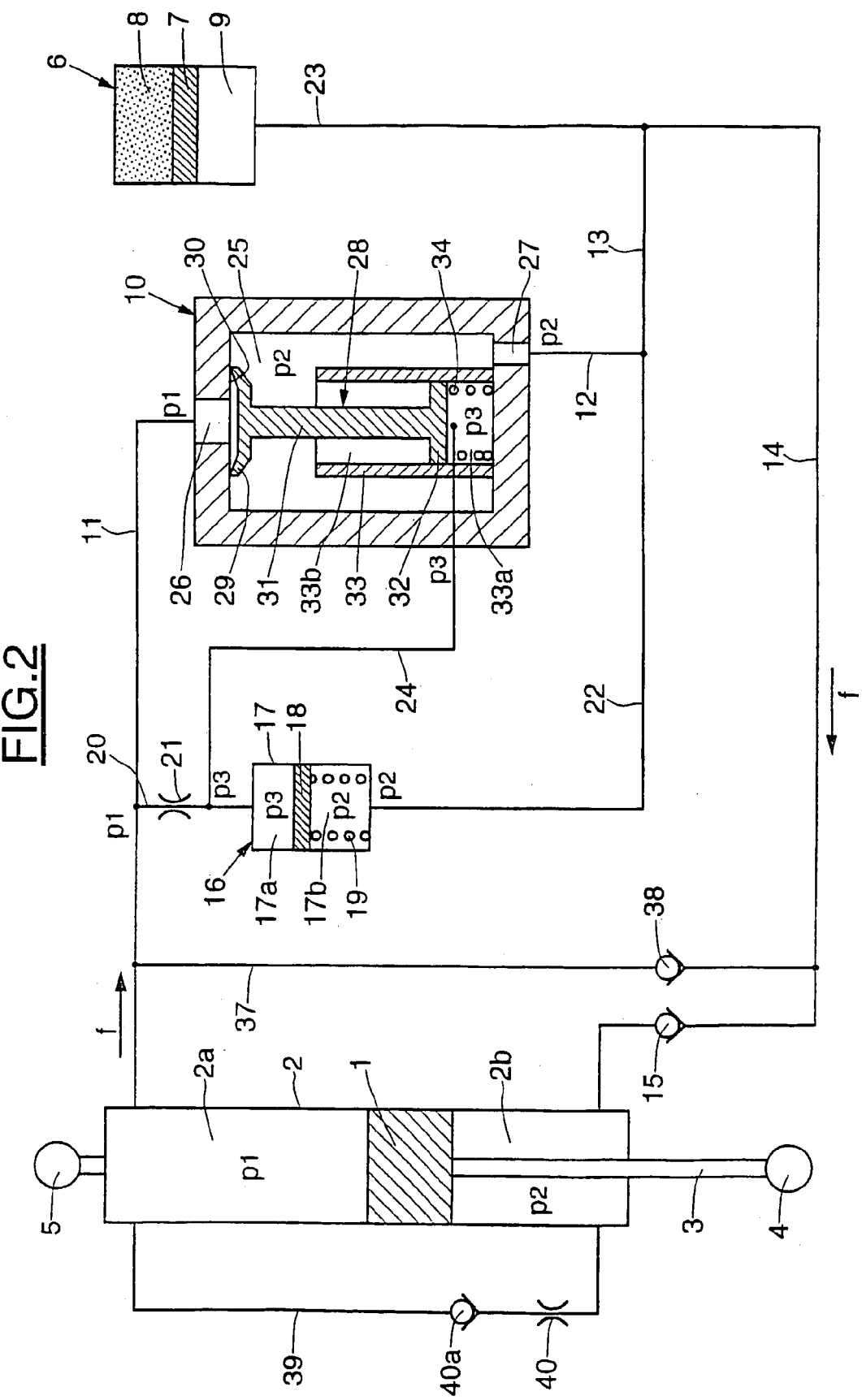

The embodiment illustrated in FIG. 2, in which the similar parts and units have the same references, differs from the embodiment in FIG. 1 only by the internal structure of the control valve 10.

In the embodiment illustrated in FIG. 2, in practice, the movable valve element 28 includes a stem 31 with no through passage. The regulation cylinder 33 is open at the top part, so that the valve element piston 32 defines only one closed regulation chamber 33a. Subject, as previously, to the control pressure $p_3$ in this embodiment, upon a compression movement of the damper, the pressure $p_2$ is exerted both inside the control chamber 25 and on the top part of the valve element piston 32.

Upon a compression movement, the balance of the forces on the movable valve element 28 can be expressed:

$$F=p_1S-p_2(S-s_t)+p_2(s-s_t)-p_3s \quad (3)$$

which can be transformed to:

$$F=(p_1-p_2)(S-s)+(p_1-p_3)S \quad (4)$$

In this embodiment, the movable valve element 28 can be such that the difference between the bearing cross-section of the valve element S and the cross section s of the valve element piston 32 is small, in order to control the pressure differential $p_1-p_2$ using a reduced spring force F while having a large valve element head 29, enabling a high flow rate when the control valve 10 is open.

The embodiment illustrated in FIG. 2 operates in the same way as the embodiment illustrated in FIG. 1.

Figure 3:
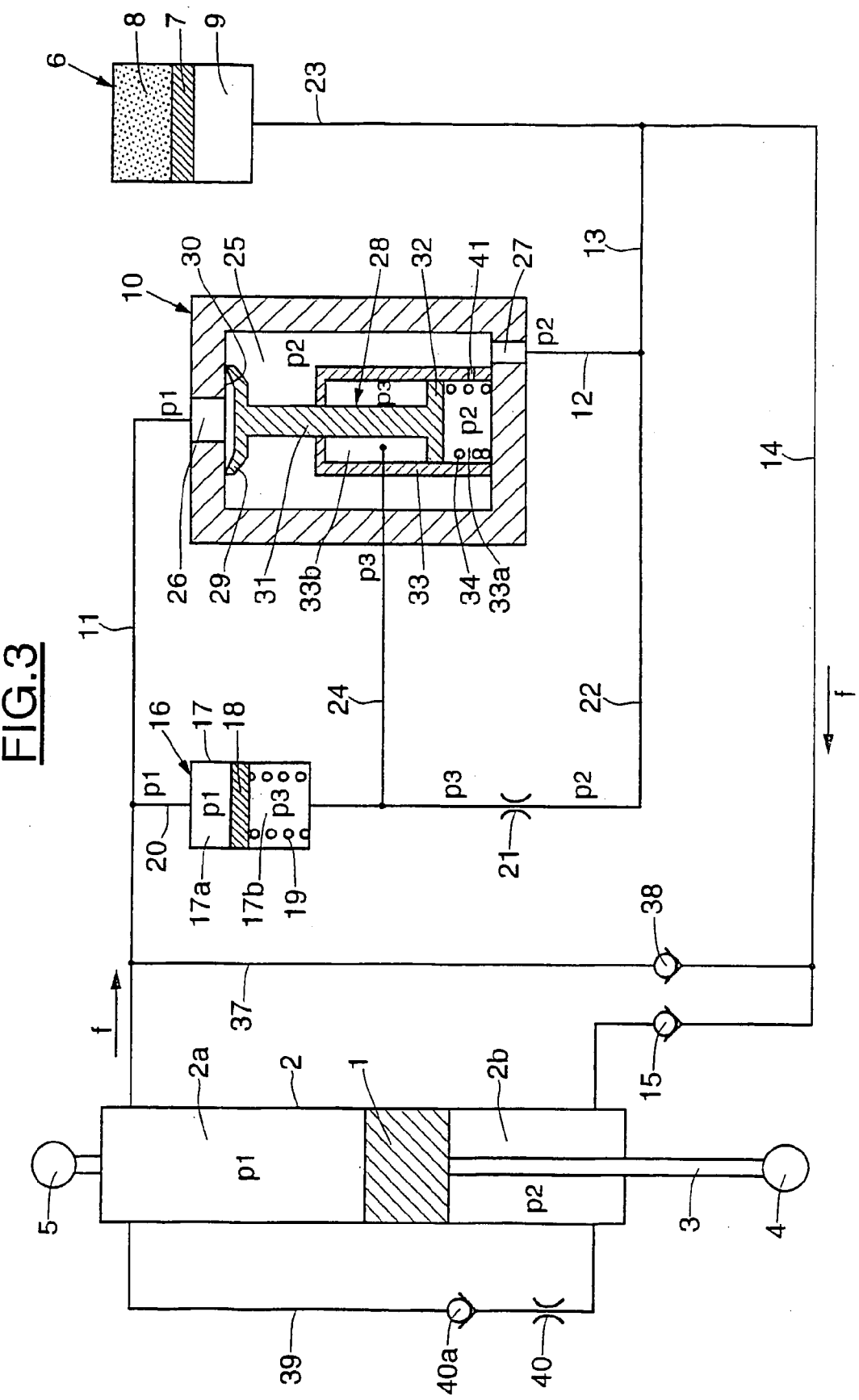

The embodiment illustrated in FIG. 3 differs from the embodiment illustrated in FIG. 1 by the positioning of the filtering restriction 21 on the pipe 22 and not on the pipe 20, in other words at the outlet of the second part 17b of the balancing chamber 17. Furthermore, the balancing pipe 24 here links the second part 17b of the balancing chamber 17 to the second chamber 33b of the regulation cylinder 33 of the control valve 10.

In this way, upon a compression movement of the damper, and in the same conditions as for the embodiment in FIG. 1, a flow is established through the restriction 21 on a variation in the pressure differential $p_1-p_2$ between the inlet and the outlet of the control valve 10. The control pressure $p_3$, obtained therefrom through the restriction 21, is directed via the balancing pipe 24 into the second chamber 33b.

A passage 41 provided in the wall of the regulation cylinder 33 connects the first regulation chamber 33a with the control chamber 25, so that the pressure $p_2$ which prevails, upon a compression movement, in said control chamber 25, is also exerted in the first regulation chamber 33a.

In the embodiment illustrated in FIG. 3, the valve element stem 31 has no through passage and the regulation cylinder 33 is closed, apart from the passage 41.

Upon a compression movement, the balance of the forces on the movable valve element 28 is defined by the equation:

$$F=p_1S-p_2(S-s_t)+p_3(s-s_t)-p_2S \quad (5)$$

which is transformed to:

$$F=(p_1-p_2)S+(p_3-p_2)(s-s_t) \quad (6)$$

Figure 4:
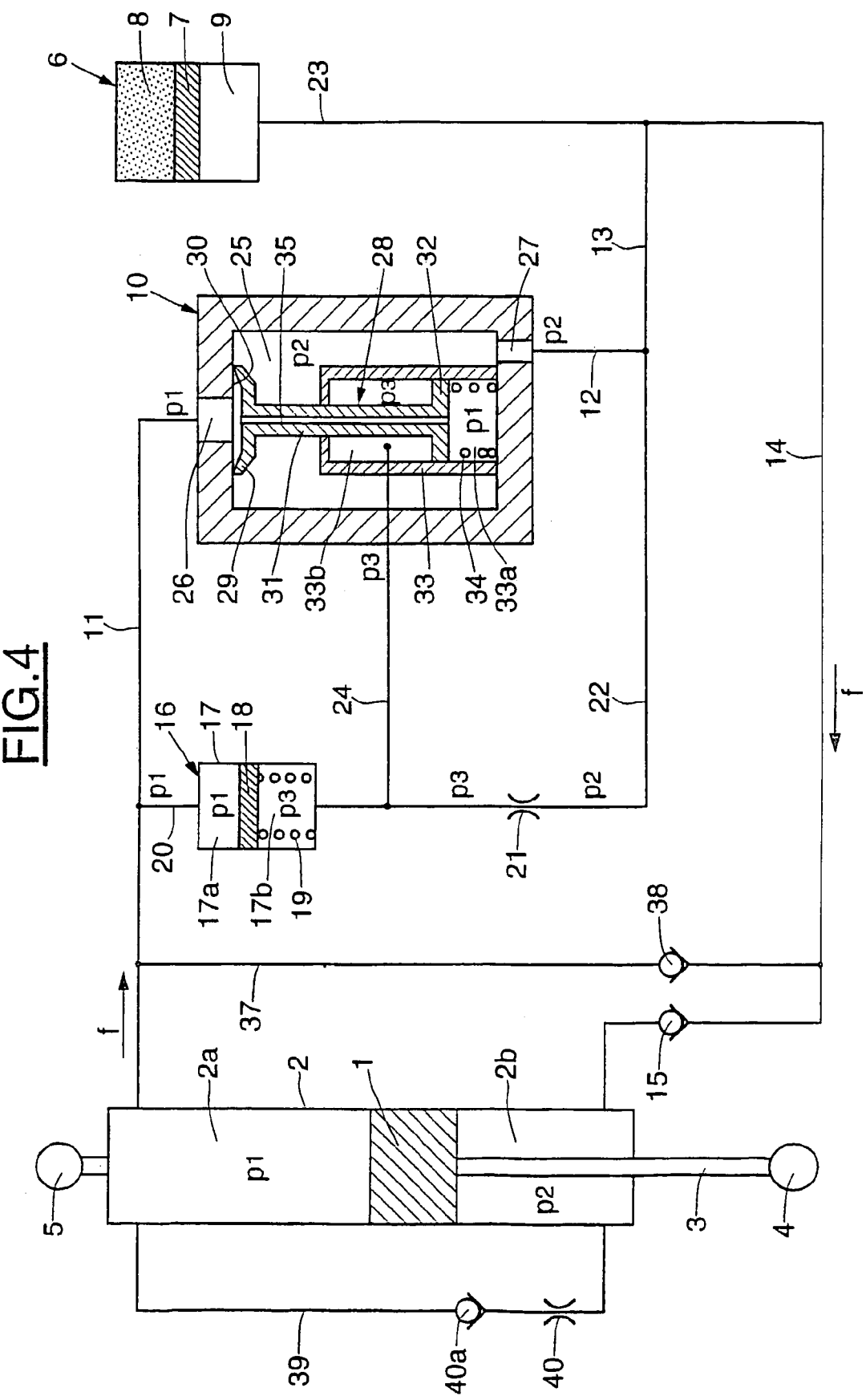

In the embodiment illustrated in FIG. 4, the filtering means 16 are the same as those illustrated in FIG. 3, in other words the balancing restriction 21 is positioned at the outlet of the balancing chamber 17 on the pipe 22. The general structure of the control valve 10 is very similar to that of the control valve 10 in the embodiment illustrated in FIG. 3. However, in the embodiment illustrated in FIG. 4, the valve element stem 31 comprises a through passage 35 which connects the external surface of the valve element head 29 with, in this case, the first regulation chamber 33a, inside which the pressure $p_1$ therefore prevails upon a compression movement. The regulation cylinder 33 is closed, so that the second chamber 33b is subject to the control pressure $p_3$ whereas the control chamber 25 is subject to the pressure $p_2$.

Upon a compression movement, the balance of the forces on the movable valve element 28 is defined by the equation $$F=p_1S-p_2(S-s_t)+p_3(s-s_t)-p_1s \quad (7)$$

which is transformed to:

$$F=(p_1-p_2)(S-s_t)+(p_3-p_2)(s-s_t) \quad (8)$$

The embodiment illustrated in FIG. 4 can be used to obtain the same advantageous results as for the embodiment illustrated in FIG. 2.

In the embodiments illustrated in FIGS. 1 to 4, the movable valve element of the control valve 10 is subject to the action of a spring. It is also possible to generate a hydraulic force acting in the same conditions on the movable valve element.

The embodiments illustrated in FIGS. 5, 6, 7 and 8 illustrate this situation.

Figure 5:
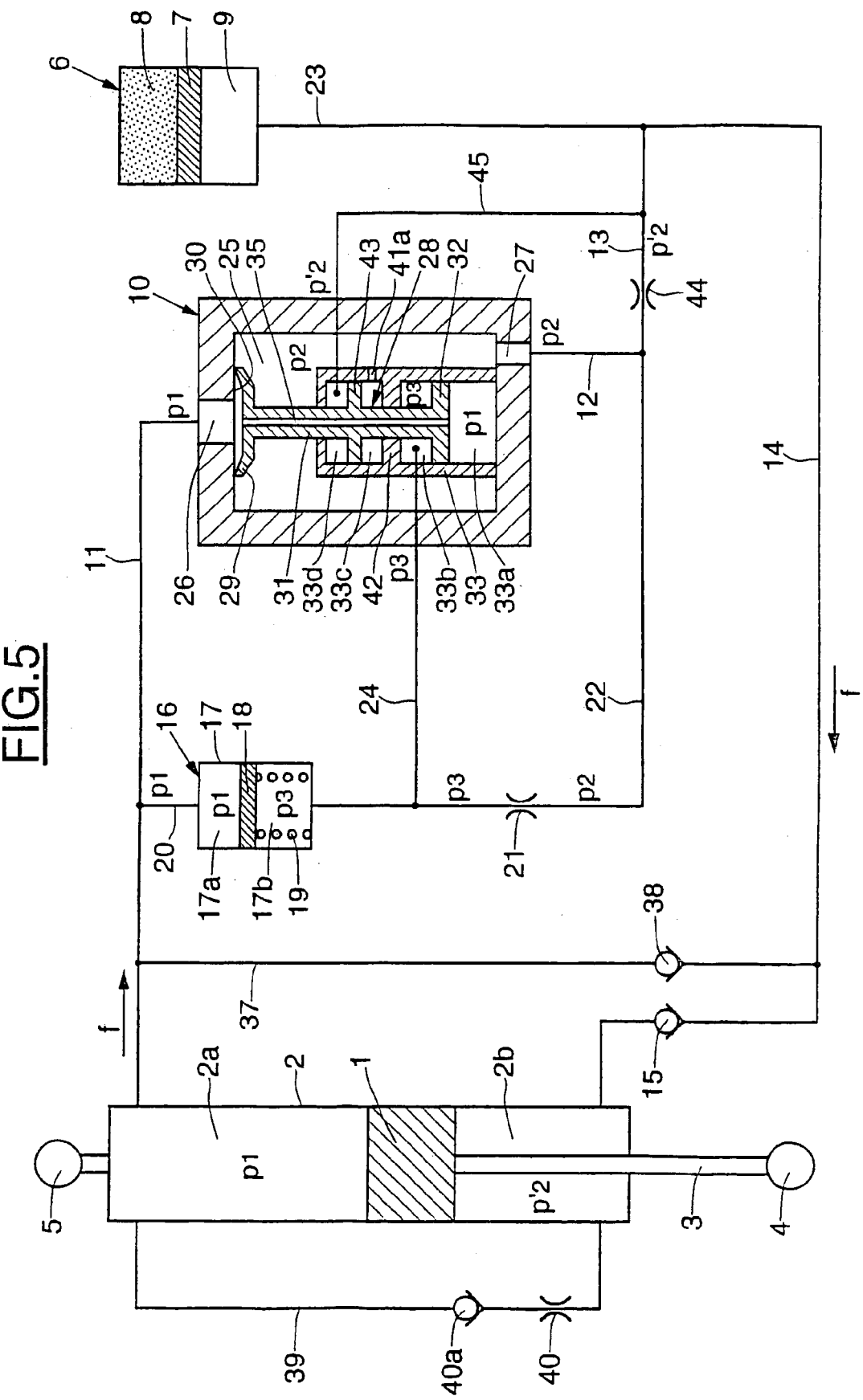

In the embodiment in FIG. 5, the filtering means 16 are the same as in the embodiment illustrated in FIG. 4 and comprise in particular a balancing chamber 17 and a filtering restriction 21 on the pipe 22.

In the embodiment illustrated in FIG. 5, the through passage 35 provided in the valve element stem 31, connects the external surface of the valve element head 29 adjacent its seat 30 with the first closed regulation chamber 33a defined inside the regulation cylinder 33. The regulation cylinder 33 comprises a partition 42 which divides the regulation cylinder 33 into two parts, one containing the valve element piston 32 and the other containing an auxiliary piston 43 integral with the valve element stem 31. The auxiliary piston 43 defines in the regulation cylinder 33 a third and a fourth regulation chamber 33c, 33d. Furthermore, a passage 41a is provided in the wall of the regulation cylinder 33 to connect the control chamber 25 with the third regulation chamber 33c which is also delimited by the partition 42.

The balancing pipe 24 links the outlet of the balancing chamber 17 near to the second part 17b of the latter with the second regulation chamber 33b. An additional restriction 44 is mounted in the pipe 13 at the outlet of the control valve 10, between the valve 10, and the second chamber 2b of the cylinder 2. The pressure downstream of the restriction 44 is directed via the pipe 45 into the fourth regulation chamber 33d.

In this way, upon a compression movement, the pressure prevailing at the inlet of the control valve 10 is the pressure $p_1$ which is also applied in the first regulation chamber 33a. The second regulation chamber 33b is subject to the control pressure $p_3$, generated upstream of the restriction 21 at the outlet of the balancing chamber 17 upon a variation in the pressure differential $p_1-p_2$. The pressure $p_2$ prevails at the outlet of the control valve 10 and inside the control chamber 25, and in the third balancing chamber 33c. Downstream of the additional restriction 44, a pressure $p'_2$ is then defined which is applied inside the fourth control chamber 33d and that is also found in the second chamber 2b of the cylinder 2.

The balance of the movable valve element 28 upon a compression movement can be defined by the following equation:

$$P_1(S-s)-p_2(S+s-2s_t)+p'_2(s-s_t)+p_3(s-s_t)=0 \quad (9)$$

which is transformed into the equation:

$$(p_1-p_2)(S-s)+(p_3-p_2)(s-s_t)=(p_2-p'_2)(s-s_t) \quad (10)$$

in which the term $(p_3-p_2)$ $(s-s_t)$ represents the filtering function, whereas the term $(p_2-p'_2)$ $(s-s_t)$ represents the hydraulic force that has been generated to act on the movable valve element 28 in place of the force of the spring used in the embodiments described previously. In this embodiment, it is therefore the additional restriction 44 which indirectly generates the hydraulic force designed to close the control valve 10. The spring 34 of the preceding embodiments, which serve the same function, can therefore be eliminated.

The additional restriction 44, provided in the embodiment in FIG. 5, between the control valve 10 and the second chamber 2b of the cylinder 2, can also be arranged differently.

Figure 6:
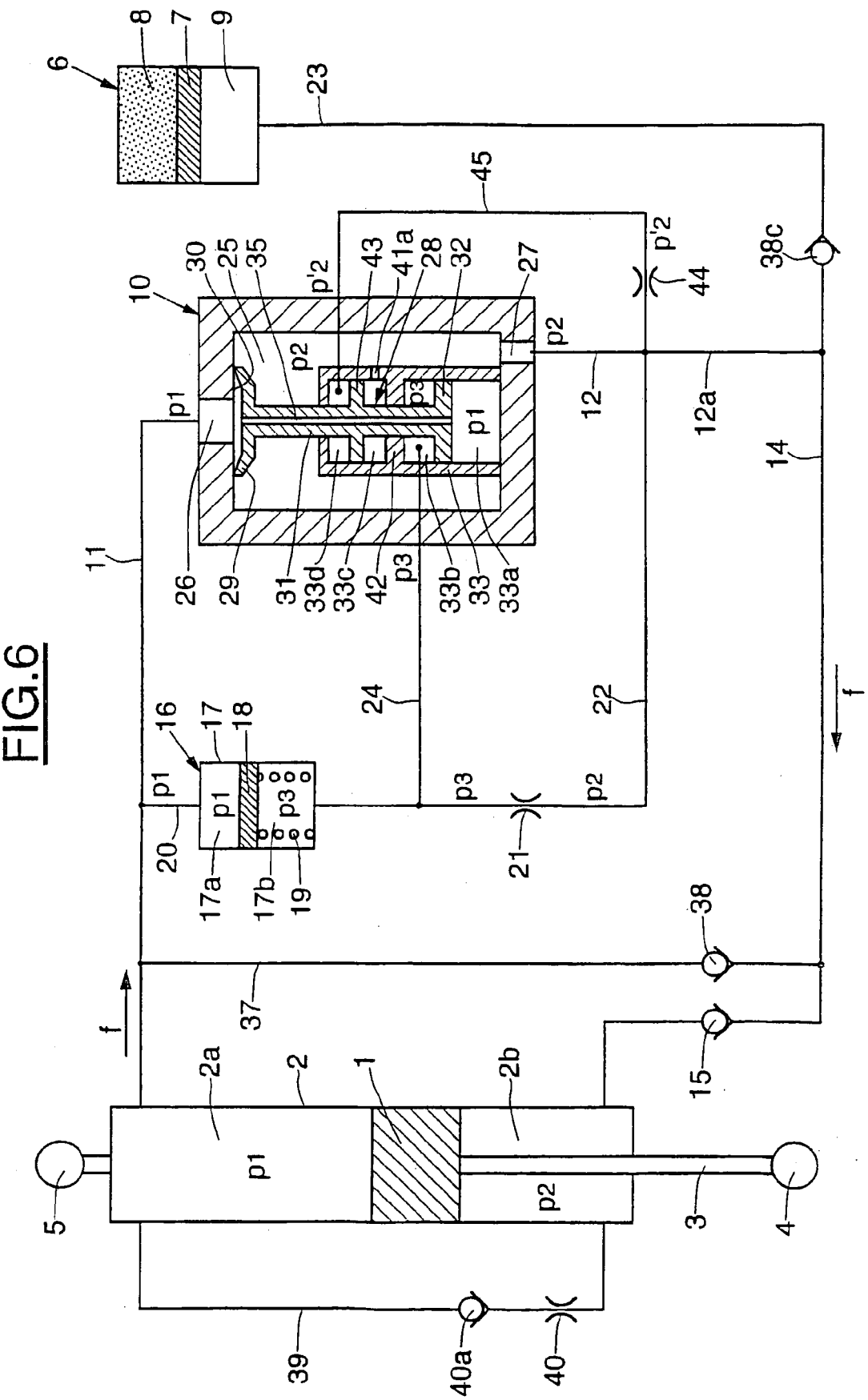

FIG. 6 illustrates such a variant in which the identical parts have the same references as in FIG. 5. In this embodiment, an additional link 12a links the outlet 27 of the control valve 10 to the second chamber 2b of the cylinder 2 through the intermediary of the nonreturn valve 15. A nonreturn valve 38c forces the fluid flow toward the reservoir in order to pass through the restriction 44. The additional restriction 44, which serves the same purpose as in the embodiment in FIG. 5 and because of this replaces the spring 34, is here positioned in the pipe 13 through which the hydraulic fluid returning to the reservoir 6 flows. In this embodiment, the pressure prevailing in the second chamber 2b of the cylinder 2 is the pressure $p_2$.

Figure 7:
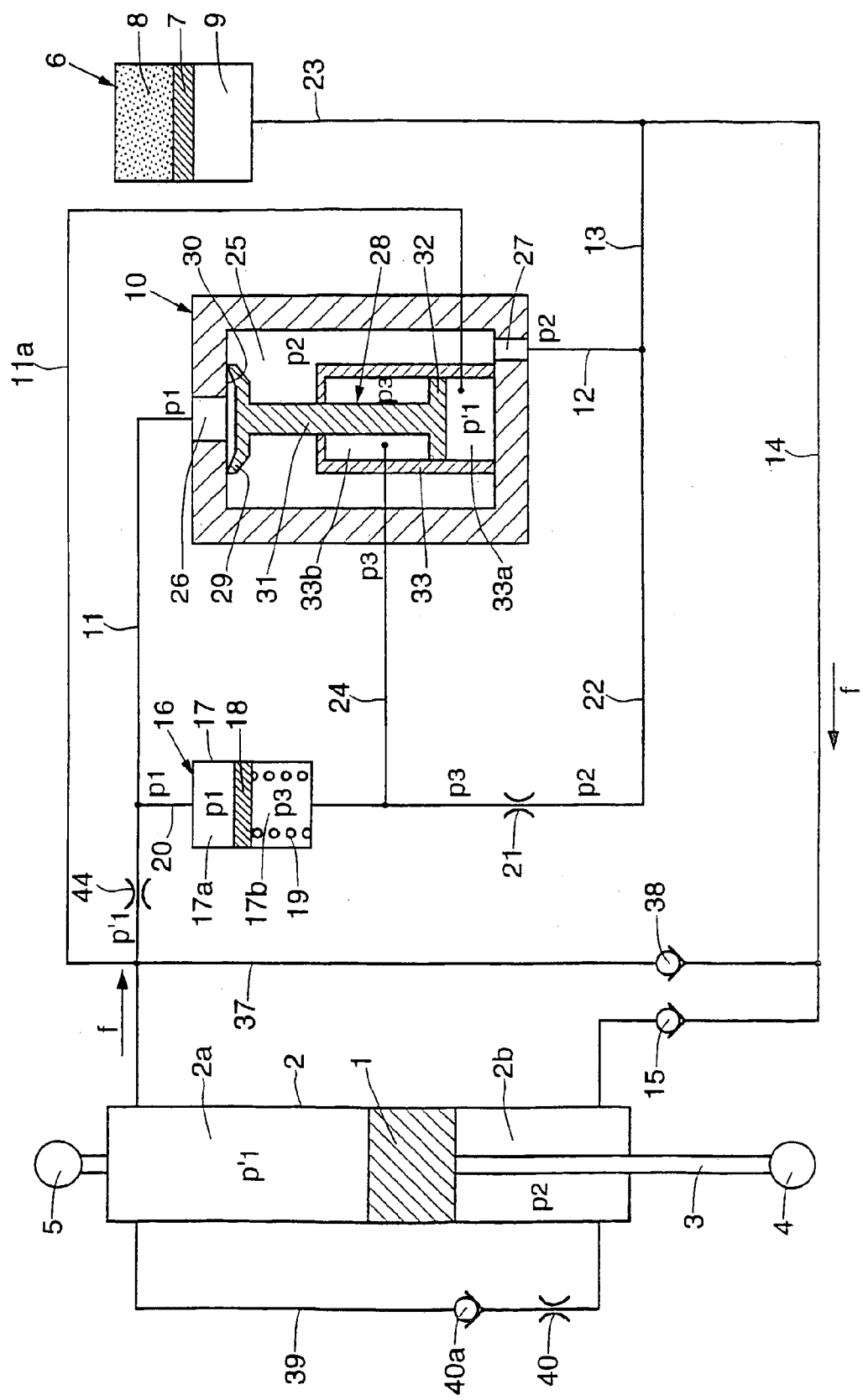

Another arrangement of the additional restriction 44 is illustrated in FIG. 7 which constitutes a variant similar to that illustrated in FIG. 3. The identical parts have the same references. In this variant, the additional restriction 44 is positioned in the pipe 11, upstream of the filtering means 16, in other words between the first chamber 2a of the cylinder 2 and the control valve 10. The restriction 44 thus generates a pressure $p'_1$ which is transmitted via an additional pipe 11a to the first regulation chamber 33a. In this embodiment, the first regulation chamber 33a is a closed chamber and contains no spring 34.

As in the case of the embodiments illustrated in FIGS. 5 and 6, the additional restriction 44 is therefore used to generate a hydraulic force designed to close the control valve 10, in other words acting on the movable valve element 28 in the direction designed to press it onto its seat 30.

The balance of the movable valve element 28 upon a compression movement can be defined by the following equation:

$$p_1S-p_2(S-s_t)+p_3(s-s_t)-p_1's=0 \quad (11)$$

which is transformed into the equation:

$$(p_1-p_2)(S-s)+(p_3-p_2)(s-s_t)=(p_1'-p_1)s \quad (12)$$

in which the term $(p_3-p_2)$ $(s-s_t)$ represents the filtering function and the term $(p_1'-p_1)s$ represents the hydraulic force generated by the additional restriction 44.

Figure 8:
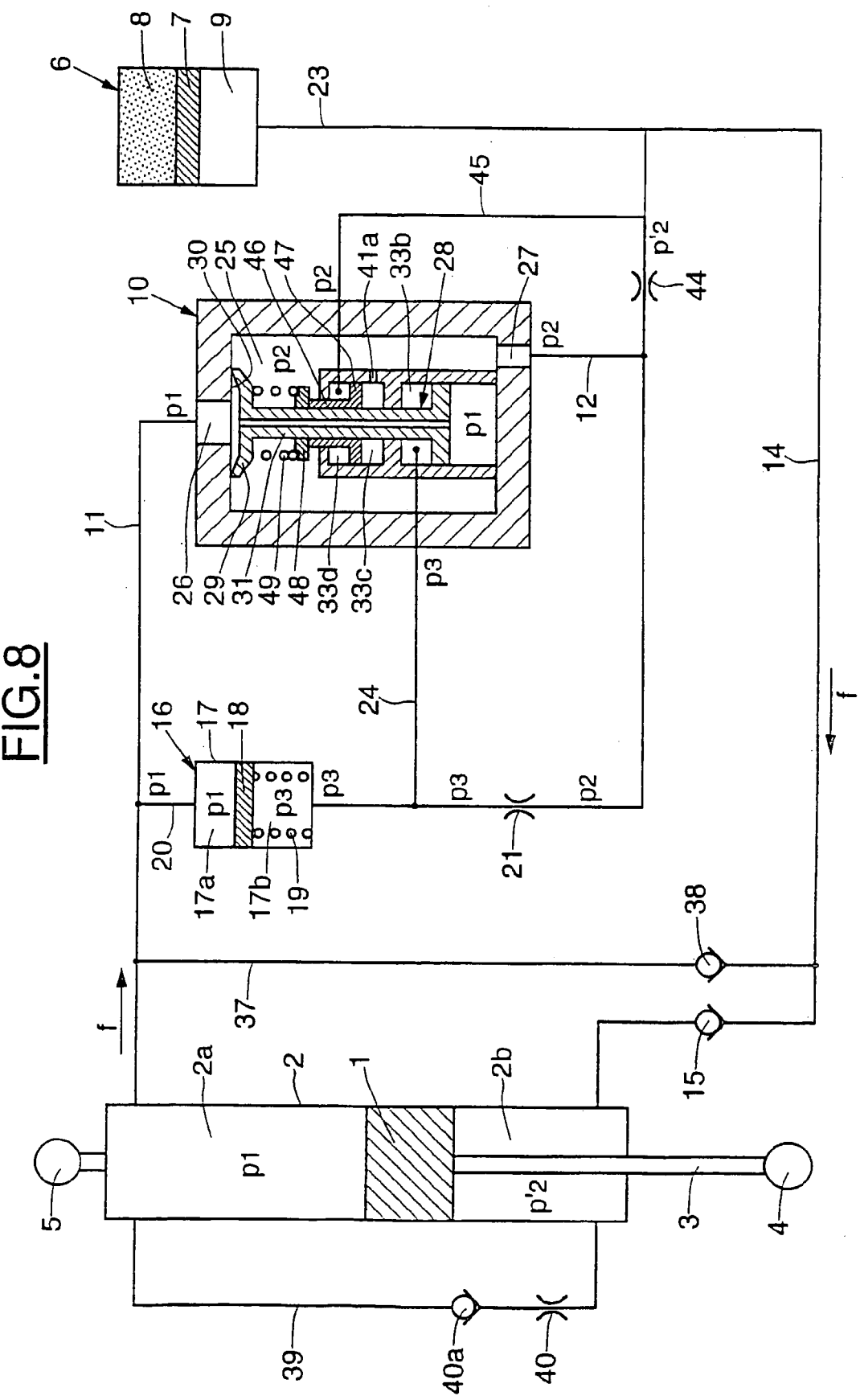

The embodiment illustrated in FIG. 8 constitutes another variant of the embodiment illustrated in FIG. 5. The force acting on the movable valve element is also created hydraulically but, this time, is transmitted to the movable valve element through the intermediary of a spring to avoid high frequency fluctuations in this force in the case where hydraulic turbulences appear in the restriction 44. This effect complements that of the filtering means 16, in particular in the top part of the frequency spectrum.

As illustrated in FIG. 8, in which the parts identical to those already illustrated in FIG. 5 have the same references, a sleeve 46 is mounted so as to slide along the valve element stem 31. The sleeve 46 has a shoulder forming an auxiliary piston 47 which in a way replaces the auxiliary piston 43 illustrated in FIG. 5, which was integral with the valve element stem 31. The auxiliary piston 47 thus separates the third regulation chamber 33c from the fourth regulation chamber 33d, in the same conditions as for the auxiliary piston 43 of the embodiment illustrated in FIG. 5. The part of the sleeve 46 which slides along the stem 31 presses against a washer 48 which is used to support a spring 49, which presses under the valve element head 29.

The force R of the compression spring 49 therefore balances the hydraulic force generated by the restriction 44 according to the equation:

$$R=(p_2-p'_2)(s-s_p) \quad (13)$$

in which $s_p$ is the cross section of the sleeve 46 surrounding the valve element stem 31.

The force R of the spring 49 furthermore opposes the opening of the valve 10, in other words the separation of the valve element seat 29 from its seat 30. The balance of these forces in this respect can be expressed:

$$R=p_1(S-s)-p_2(S-s_t)+p_3(s-s_t) \quad (14)$$

which is transformed into the following form:

$$R=(p_1-p_2)(S-s)+(p_3-p_2)(s-s_t) \quad (15)$$

In this equation, the term $(p_3-p_2)$ $(s-s_t)$ represents the filtering effect and, finally, the same effect is obtained as in the embodiment in FIG. 4, but also with a filtering of the high frequencies by the spring 49.

Figure 9:
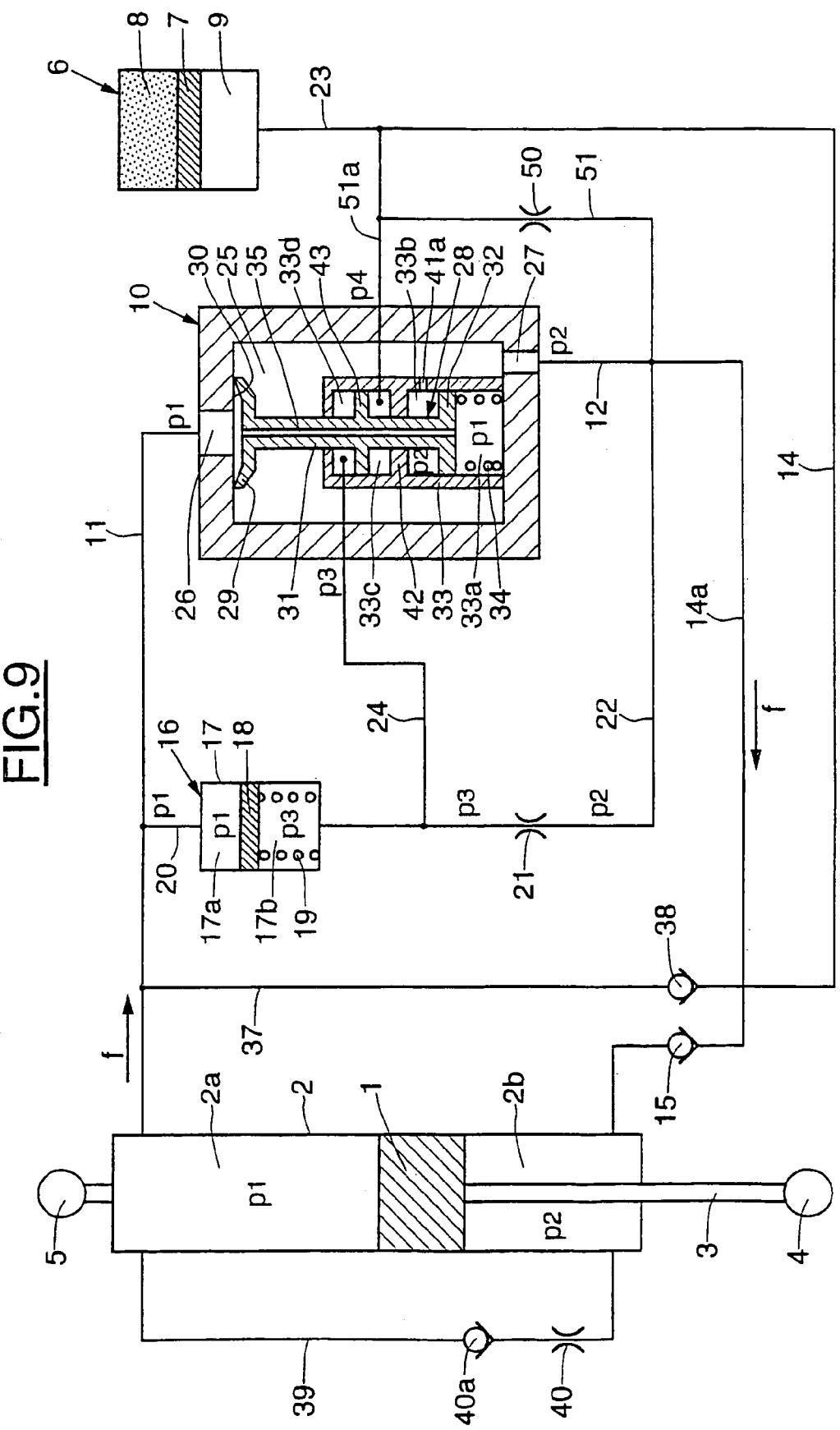

The embodiment illustrated in FIG. 9 in which the parts that are identical to the preceding embodiments have the same references, comprises a spring 34 acting on the movable valve element 28 as was the case in the embodiments in FIGS. 1 to 4. For the remainder, the embodiment in FIG. 9 has similarities with the embodiment in FIG. 5, with the following modifications.

The filtering pipe 24 conveying the filtering control pressure $p_3$ is linked to the fourth chamber 33d.

An additional restriction 50 is mounted in a pipe 51 which is linked, on the one hand, via the pipe 12 to the outlet of the control valve 10 and, on the other hand, to the pipe 23 for returning to the reservoir 6. The restriction 50 therefore conveys the hydraulic fluid flow returning to the reservoir 6 upon a compression movement of the damper resulting in a greater penetration of the stem 3 inside the cylinder 2. Downstream of the restriction 50, upon a compression movement, a pressure $p_4$ is defined, which is applied via the pipe 51a in the third regulation chamber 33c, which, in the embodiment illustrated in FIG. 9, is a closed chamber which is therefore not connected to the control chamber 25 at the pressure $p_2$.

The second regulation chamber 33b has a passage 41a, connecting it with the control chamber 25, in such a way that the pressure $p_2$ prevails in said second regulation chamber 33b. A spring 34 is mounted in the first regulation chamber 33a so as to act on the valve element piston 32, designed to close the control valve 10.

Finally, an additional pipe 14a linked to the pipe 12 at the outlet of the control valve 10 is used to return the hydraulic fluid flow to the second chamber 2b of the cylinder 2 via the nonreturn valve 15. In the embodiment illustrated in FIG. 9, the restriction 50 generates a pressure $p_4$, capable of opening the control valve 10 on the high compression speeds of the stem 3 of the damper. The result is a reduction in the damping force at the high compression speeds.

The forces acting on the movable valve element 28, in the embodiment in FIG. 9, are expressed by the equation:

$$R=p_1 S-p_2(S-s_t)+(p_2-p_4)(s-s_t)+p_3(s-s_t)-p_1 s \qquad (16)$$

which can be transformed to the following form:

$$R=(p_1-p_2)(S-s)+(p_3-p_2)(s-s_t)+(p_2-p_4)(s-s_t) \qquad (17)$$

Figure 10:
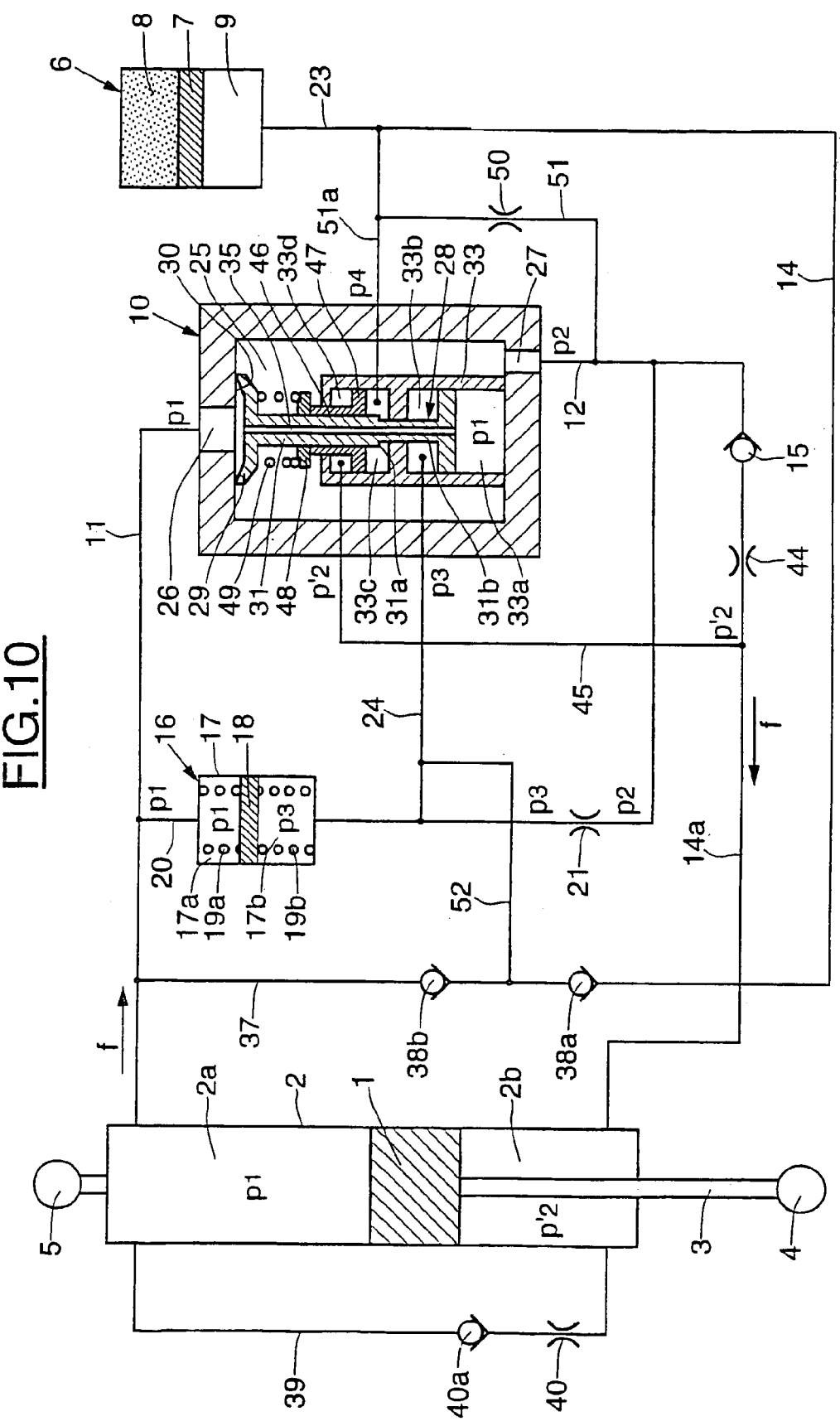

The embodiment illustrated in FIG. 10 is similar in principle to the embodiment illustrated in FIG. 9, but with some modifications. The elements that are identical or similar to the preceding embodiments have the same references.

The movable piston 18 of the balancing chamber 17 is here subject to the opposing action of two springs 19a and 19b positioned on either side of the movable piston 18. In this way, both springs can be made to work in the linear part of their characteristic. In practice, one of the springs, spring 19b for example, is stiffer than the second, spring 19a.

It will be understood that such a structure can be used in the embodiments described previously.

The restriction 44 is also used in this embodiment to define the pressure $p'_2$ when the hydraulic fluid leaving the control valve 10 at the pressure $p_2$ flows toward the second chamber 2b of the damper 2, in which the pressure $p'_2$ prevails. As previously, the restriction 44 generates a hydraulic force designed to close the control valve, without requiring the addition of a tension spring.

The nonreturn valve 15 of the preceding embodiments, and in particular of the embodiment illustrated in FIG. 9, has been moved to be located upstream of the fluid flow in relation to the restriction 44 upon a compression movement. This involves a simple change of construction which could obviously be used in all the embodiments described previously.

The third restriction 50 is mounted in a pipe 51 which is linked, on the one hand, via the pipe 12 to the outlet of the control valve 10 and, on the other hand, to the pipe 23 returning to the reservoir 6. The restriction 50 therefore conveys the hydraulic fluid flow returning to the reservoir 6 upon a compression movement of the damper resulting in a greater penetration of the stem 3 inside the cylinder 2.

Downstream of the restriction 50, upon a compression movement, a pressure $p_4$ is defined, which is applied via the pipe 51a in the third regulation chamber 33c, which, in the embodiment illustrated in FIG. 10, is a closed chamber which is therefore not connected with the control chamber 25 at the pressure $p_2$. As in the embodiment in FIG. 9, the restriction 50 therefore generates a pressure designed to open the control valve on high compression speeds.

The valve element stem 31 has, in this embodiment, a shoulder 31a which defines a bottom portion 31b of the valve element stem 31, with a diameter smaller than the top portion. The shoulder 31a remains in operation, inside the third regulation chamber 33c.

The nonreturn valve 38 of the preceding embodiments is, in the embodiment illustrated in FIG. 10, replaced by two nonreturn valves 38a, 38b placed in series. A link 52 connected between the two nonreturn valves 38a, 38b is linked to the pipe 24, itself connected to the outlet of the balancing chamber 17 and transmitting the control pressure $p_3$ to the second regulation chamber 33b. In a decompression movement of the damper, this arrangement allows for a return of the fluid from the reservoir 6, with the control valve 10 and the filtering means 16 then not involved. In this way, the fluid refills the first chamber 2a and thus compensates for the reduction in the submerged volume of the stem 3. This arrangement can also be used to facilitate the return of the movable piston 18 from the balancing chamber 17 to its rest position in balance between the two springs 19a, 19b.

Figure 11:
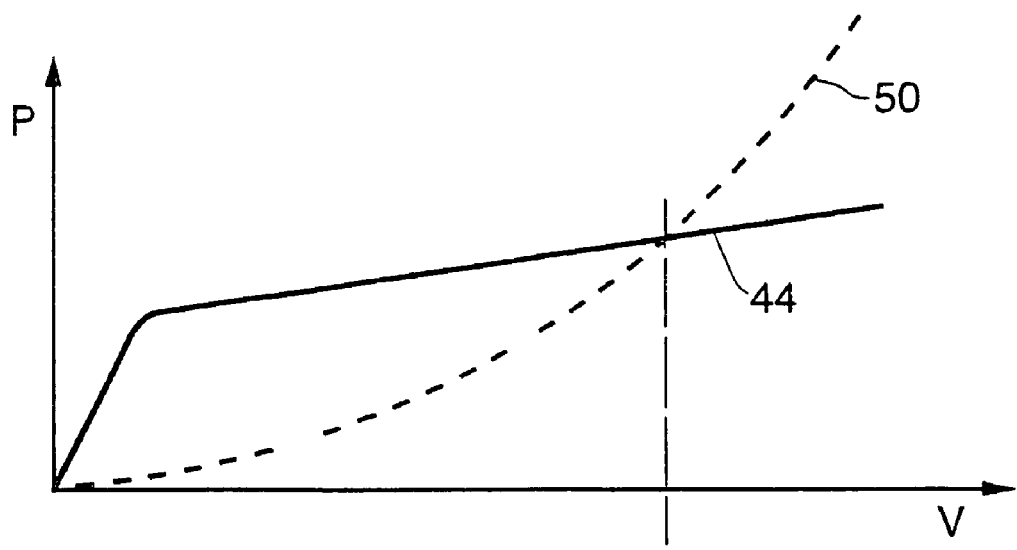
FIG. 11 is a graph plotting the variation in the pressures generated by two restrictions.

In this embodiment, the two restrictions 44 and 50 will preferably be chosen to offer different characteristics. The curves illustrated in FIG. 11 show the respective characteristics of the restrictions 44 and 50 respectively in solid and dashed lines. The pressure drop P is represented on the Y axis and the speed V of the compression movement on the X axis.

The restriction 44 is chosen to create a pressure drop P which first of all increases very rapidly for the small compression speed values corresponding to small flow rate values of the flow passing through the restriction. Then, this pressure drop increases very slowly. It would be very easy to implement such a characteristic using, for example, a thin metallic film of foil pretensioned using a spring system.

Conversely, the restriction 50 is chosen to present a characteristic in which the pressure drop P increases slowly for the low flow rates corresponding to low compression speeds, then increases more rapidly when the speed and the flow rate increase. Such a characteristic can easily be obtained using a calibrated orifice.

Figure 12:
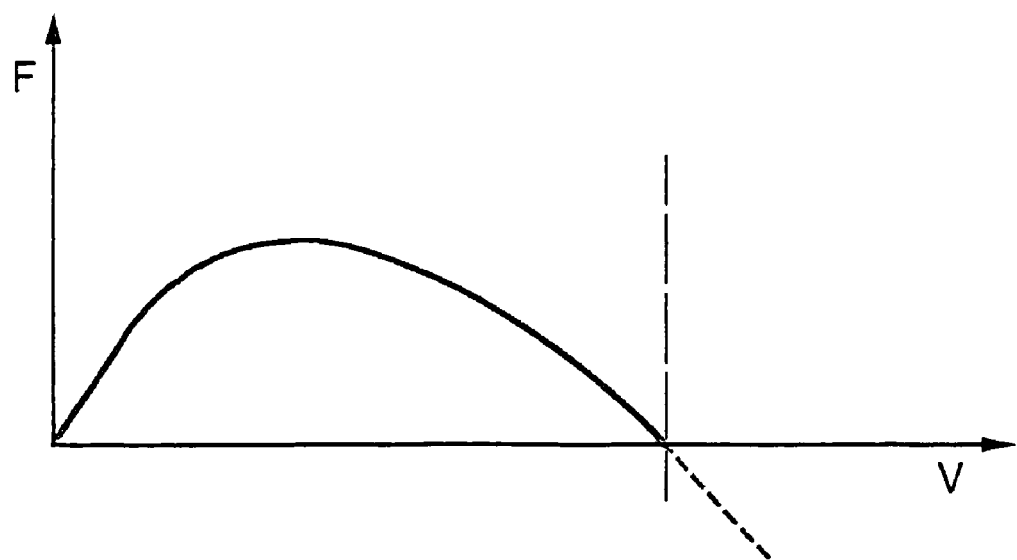
FIG. 12 is a graph plotting the variation in the damping force.

By making the pressures $p'_2$ and $p_4$ generated respectively by the two restrictions 44 and 50 act on the opposing surfaces of the auxiliary piston 47, in other words in the fourth regulation chamber 33b and in the third regulation chamber 33c, a force is created by hydraulic means which rapidly increases with the speed of the compression movement, passes through a maximum, and then decreases and changes direction causing the control valve 10 to open. FIG. 12 illustrates the variations in the damping force F according to the compression movement speed V. The part of the curve shown by a dashed line is of no practical interest, since the control valve 10 is then in the fully open position. A damping force is thus obtained which increases with the compression speed for low speeds, then passes through a maximum and decreases at the high compression speeds. This is particularly interesting if vibrations or impacts on the body of the vehicle caused by localized degradations of the road surface are to be avoided.

It will obviously be understood that the same advantage could be obtained using a similar arrangement of the two restrictions 44 and 50 in a control valve structure as illustrated in FIG. 9, in which the hydraulic forces are applied directly to the auxiliary piston 43 integral with the valve element stem 31.

The balance of the forces exerted on the movable valve element 28 of the embodiment illustrated in FIG. 10, is defined in the following way, in which R is the force of the spring 49, $s_t$ is the smaller cross section of the valve element stem 31 and $s_r$ is the larger cross section of the valve element stem 31:

$$R = p_4(s-s_t) - p_2(s_p-s_t) - p'_2(s-s_p) \quad (18)$$

which can be expressed $$R = (p_2-p'_2)(s-s_p) - (p_2-p_4)(s-s_t) \quad (19)$$

In this equation, the influence of the restriction 44 can be seen by the term $(p_2-p'_2)$ and that of the restriction 50 by the term $(p_2-p_4)$.

The force R of the spring is balanced hydraulically, as shown by the following equation:

$$R = p_1(S-s) + p_3(s-s_t) - p_4(s_t-s_t) - p_2(S-s_t) \quad (20)$$

which can be transformed into:

$$R = (p_1-p_2)(S-s) + (p_3-p_2)(s-s_t) + (p_2-p_4)(s_t-s_t) \quad (21)$$

in which the first term represents the main damping force, the second term expresses the filtering effect and the third term represents a decrease in the damping force for the very high compression speeds.

The result is that the damping decreases at the high compression movement speeds, both by an action on the spring 49 designed to press the movable valve element 28 against its seat 30 and, simultaneously, by a direct action on the valve element stem 31. In practice, in the embodiment illustrated in FIG. 10, the pressure $(p_2-p_4)$ generated by the restriction 50 acts on the area $(s_t-s_t)$ in such a way as to separate the valve element head 29 from its seat 30.

It will be noted that the restriction 50, which is designed to open the control valve 10 at high flow rate, in other words at high compression speeds, can be arranged, not only on the path of the reservoir as illustrated in FIGS. 9 and 10, but also between the valve 10 and the second chamber 2b of the damper 2, or even between the first chamber 2a and the control valve 10.

Figure 13:
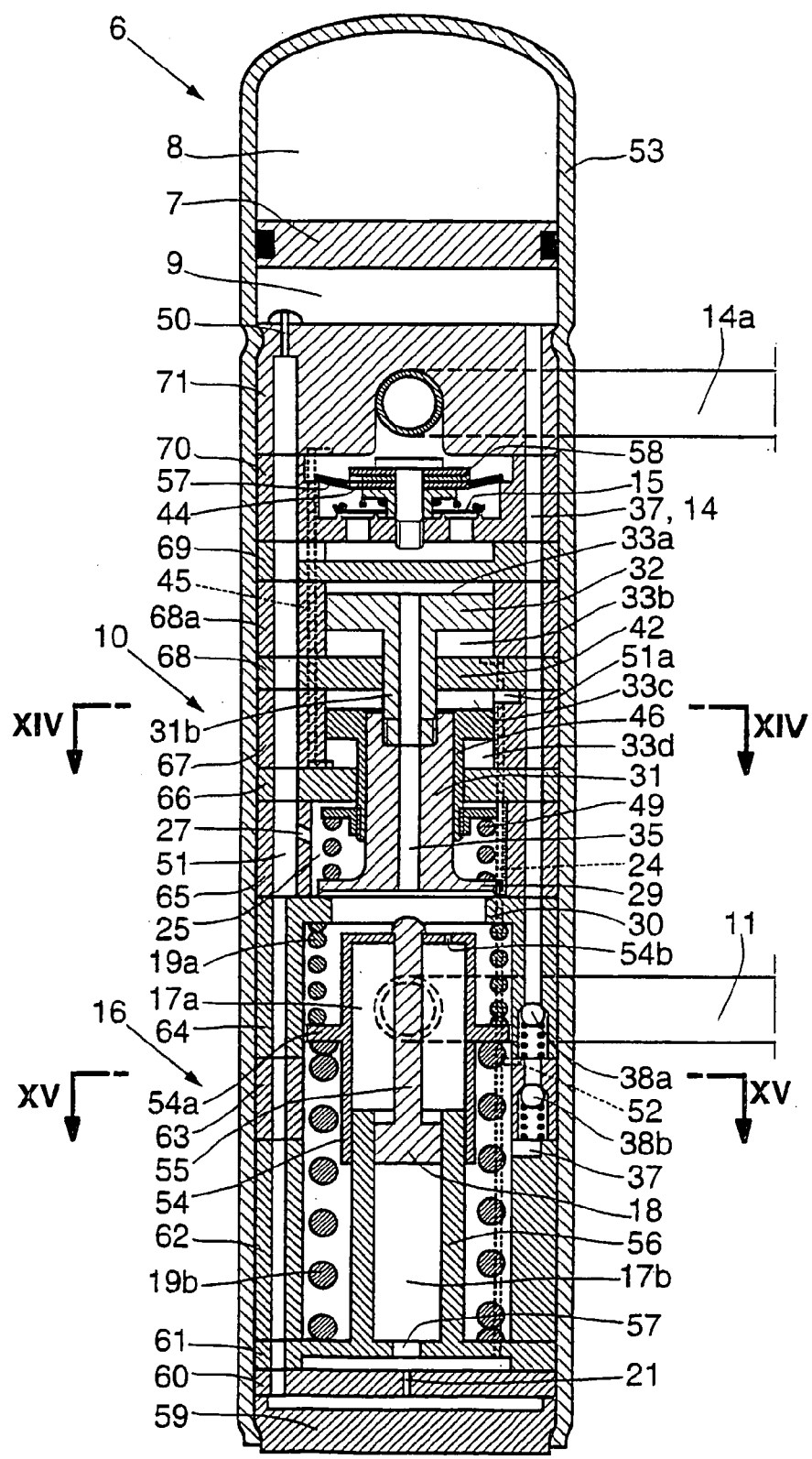
FIG. 13 is a cross-sectional view of a practical embodiment of an assembly comprising a reservoir, a control valve and filtering means in an integrated form.
Figure 14:
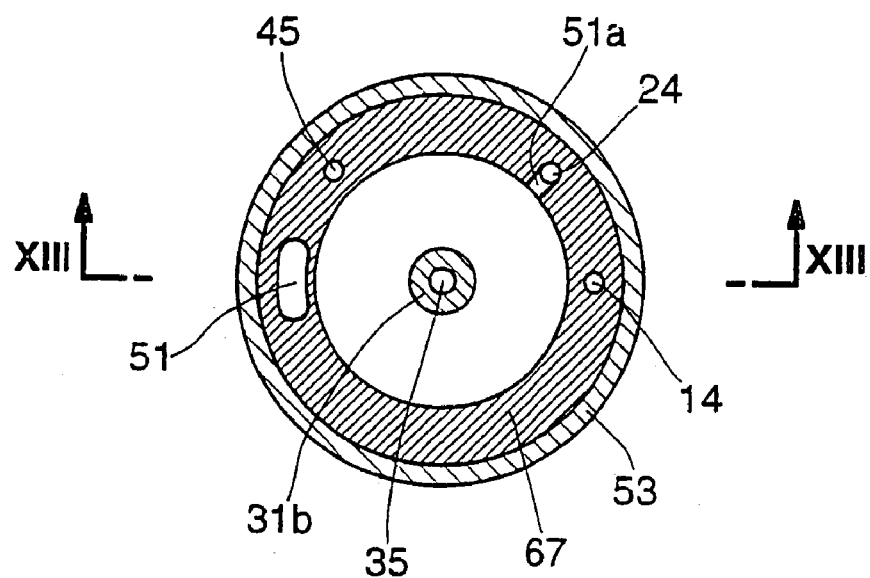
FIG. 14 is a cross-sectional view through XIV—XIV in FIG. 13.
Figure 15:
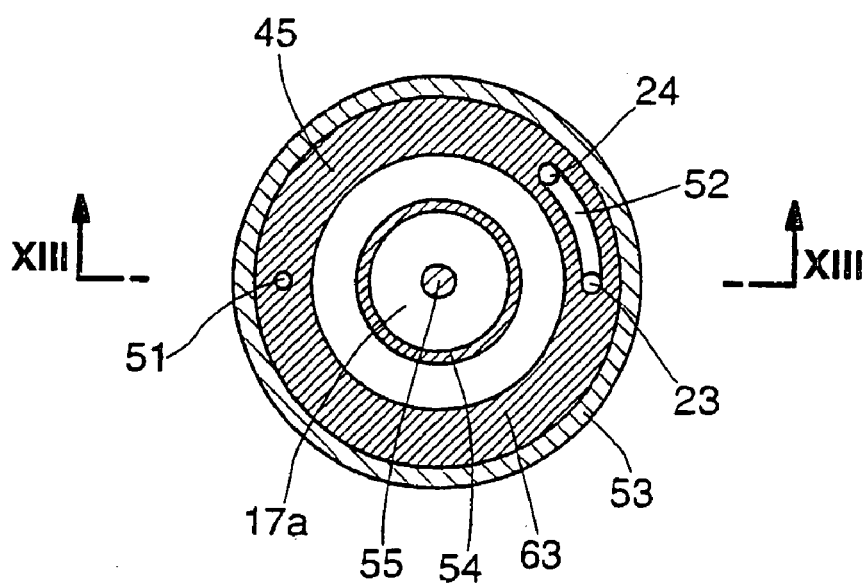
FIG. 15 is a cross-sectional view through XV—XV in FIG. 13.

There now follows a description of a practical exemplary embodiment of a control valve linked to the filtering means in accordance with the invention, illustrated in FIGS. 13, 14 and 15. In these figures, which correspond to the diagrammatic embodiment illustrated in FIG. 10, the same elements have the same references.

In FIG. 13, a casing 53 contains the filtering means 16, the control valve 10 and the reservoir 6, placed on top of one other in relation to FIG. 13. The figure also shows the spring 19b, stiffer than the secondary spring 19a, both of which act on a cylindrical part 54 comprising a shoulder 54a on which the springs 19a and 19b press.

The cylindrical part 54 defines inside a chamber that corresponds to the first part 17a of the balancing chamber 17. A pin 55, integral with the cylindrical part 54, has a bottom part of larger diameter which acts as the piston 18 by sliding inside a second cylindrical part 56, inside which the second part 17b of the balancing chamber is defined. The part 54 slides in a non-leak-tight way over the part 56 and has, in its top part, a hole 54b allowing free passage of the fluid from the chamber 17a to the valve 31 and the pipe 11. The hydraulic fluid can enter into this part 17b via an orifice 57 and then pass through a calibrated orifice which corresponds to the restriction 21.

The part 17a of the balancing chamber inside the cylindrical part 54, is connected via the pipe 11 with the first chamber of the damper, not shown in FIG. 13.

FIG. 13 also shows the valve element stem 31 with the valve element head 29 which can press on its seat 30. The valve element piston 32 is defined in an element screwed onto the valve element stem 31 and of a smaller diameter than the latter. The partition 42 also delimits, as in the embodiment illustrated in FIG. 10, a third regulation chamber 33c and a second regulation chamber 33b. The figure also shows the first regulation chamber 33a and the fourth regulation chamber 33d. The movable sleeve 46 slides along the largest diameter part of the valve element stem 31 and acts on the valve element head 29 through the intermediary of the spring 49.

FIG. 13 also shows the nonreturn valve 15 and the restriction 44 comprising a movable foil 57 clamped between several metal washers 58. Hydraulic fluid returns to the second chamber of the damper via the pipe 14a which is connected with a chamber downstream of the restriction 44.

The various units thus defined are pstemuced by stacking inside the casing 53 a certain number of annular parts suitably drilled with appropriate orifices.

Thus, FIG. 13 shows, from the bottom: a first part 59 forming an end plug; a second part 60 including the restriction 21; a third part 61 comprising the orifice 57 and the cylindrical part 56; a fourth part 62, a fifth part 63 comprising, in addition, the nonreturn valve 38b; a sixth part 64 comprising the nonreturn valve 38a; a seventh part 65 which delimits the control chamber 25; an eighth part 66 which delimits the regulation chamber 33 of FIG. 8; a ninth part 67 which defines a part of the regulation cylinder 33; a tenth part 68 which constitutes the separating partition 42; an eleventh part 69 which delimits the first regulation chamber 33a of the regulation cylinder 33; a twelfth part 70 which contains passages linked to the nonreturn valve 15 and to the restriction 44; a thirteenth part 71 containing the restriction 50; and finally the movable piston 7 separating, within the reservoir 6, the part 8 filled with gas from the part 9 filled with fluid.

FIG. 13 also shows the link pipe 51 which is pstemuced by drilling the various abovementioned parts parallel to the center line. The figure also shows the link pipe 37, 14 which is made in the same way and on which the two nonreturn valves 38a and 38b are mounted, said link pipe being linked on the one hand to the reservoir 6 and on the other hand to the passage 37. Also shown is the filtering pipe 24 in dotted lines, connected to the passage 52 connected between the two valves 38a, 38b and discharging into the chamber 33b.

The cross-sectional views in FIGS. 14 and 15 also show the link pipe 45 represented by a dashed line in FIG. 13, the filtering pipe 24 and the pipe 14. FIG. 14 shows the passage 51a which connects the pipe 24 with the chamber 33c. FIG. 15 shows the pipe 23, which is linked with the pipe 24 via the passage 52 and with the reservoir 6. The pipe 23 is in addition linked to the pipe 14 which can be seen in FIG. 15.

Internal leak-tightness is obtained by pressing the various parts against each other in the final assembly.

Leak-tightness with respect to the outside is obtained, for example, by welding the outer casing 53 onto the closing plug 59.

In the above description of the exemplary embodiments, the compression of the damper corresponded to a compression of the vehicle suspension. It will be understood that the invention could be applied without major modifications to the case of an inverted suspension in which the compression of the suspension corresponds to the extension of the damper.

The invention claimed is:

1. A damper, in particular for motor vehicles, comprising a cylinder adapted to contain a hydraulic fluid, a main piston actuated by a stem defining in the cylinder a first chamber and a second chamber, said second chamber containing the stem, a hydraulic fluid reservoir and a valve placed in the hydraulic fluid flow between the first chamber and the second chamber, said valve comprising a movable valve element cooperating with a seat and means designed to press the valve element onto its seat, filtering means being mounted in parallel with the valve, adapted to generate a filtering control pressure acting on the valve element of the valve, the control pressure depending on the pressure differential at an inlet and at an outlet of the valve, said filtering means comprising a balancing chamber divided into two parts by a movable piston, said movable piston being subjected to the action of a balancing spring means, and wherein, the two parts of the balancing chamber are respectively linked by pipes, on the one hand to the inlet of the valve, itself linked to the first chamber of the cylinder and on the other hand to the outlet of the valve, itself linked to the second chamber of the cylinder and to the reservoir, and said filtering means further compresses a filtering restriction mounted in the pipe linking one of the parts of the balancing chamber to the valve; a filtering pipe also linking said part of the balancing chamber to the valve in order to apply the filtering control pressure prevailing in said part if the balancing chamber to the movable valve element of the valve.

2. The damper as claimed in claim 1, wherein, the movable valve element of the valve is subject to a closing force designed to press the valve element on its seat.

3. The damper as claimed in claim 1, wherein, the movable valve element of the valve is subject to a closing force designed to press the valve element on its seat.

4. The damper as claimed in claim 3, wherein, the closing force is generated by a spring.

5. A damper, in particular for motor vehicles, comprising a cylinder containing a hydraulic fluid, a main piston actuated by a stem defining in the cylinder a first chamber and a second chamber, said second chamber containing the stem, a hydraulic fluid reservoir and a valve placed in the hydraulic fluid flow between the first chamber and the second chamber, said valve comprising a movable valve element cooperating with a seat and means designed to press the valve element onto its seat, filtering means mounted in parallel with the valve, adapted to generate a filtering control pressure acting on the valve element of the valve, the control pressure depending on the pressure differential at an inlet and at an outlet of the valve, wherein, the valve comprises a control chamber linked at the inlet, adjacent the seat of the movable valve element, to the first chamber of the cylinder, linked at the outlet to the second chamber of the cylinder and, the movable valve element comprises a valve element head capable of cooperating with the seat, a valve element stem and a valve element piston integral with the stem at the opposite end from the valve element head, and a regulation cylinder is housed inside the control chamber and defines a closed first regulation chamber, inside which the valve element piston slides, said regulation chamber receiving the filtering pressure.

6. The damper as claimed in claim 5, wherein, the regulation cylinder defines a closed second regulation chamber containing the valve element stem.

7. The damper as claimed in claim 6, wherein, the valve element stem has a through passage connecting the seat of the valve element with one of the regulation chambers.

8. The damper as claimed in claim 5, wherein, a filtering restriction is mounted in a pipe linking that part of a balancing chamber linked to the inlet of the valve and to the first chamber of the cylinder and a filtering pipe is linked to the first regulation chamber.

9. The damper as claimed in claim 6, wherein, a filtering restriction is mounted in a pipe linking that part of a balancing chamber linked to the outlet of the valve and to the second chamber of the cylinder and a balancing pipe is linked to the second regulation chamber.

10. The damper as claimed in claim 7, wherein, the through passage connects the seat of the valve element with the first regulation chamber and the regulation cylinder defines a third and a fourth regulation chamber containing the valve element stem, the valve element comprising an auxiliary piston separating said third and fourth regulation chambers.

11. The damper as claimed in claim 7, wherein, the through passage connects the seat of the valve element with the first regulation chamber and the regulation cylinder defines a third and a fourth regulation chamber containing the valve element stem, a sleeve forming an auxiliary piston being mounted so as to slide along the stem of the valve element, said auxiliary piston separating said third and fourth regulation chambers, the sliding sleeve pressing on the valve element head through the intermediary of a spring link.

12. The damper as claimed in claim 10, wherein, said third and fourth regulation chambers are subject respectively to the pressure downstream and upstream of a restriction mounted on an outlet pipe of the valve.

13. The damper as claimed in claim 10, wherein, the stem comprises a shoulder in the third regulation chamber.

14. The damper as claimed in claim 13, wherein, said third and fourth regulation chambers are respectively subject to the pressure downstream of a restriction mounted on an outlet pipe of the valve toward the second chamber of the cylinder and to the pressure downstream of a restriction mounted on an outlet pipe of the valve toward the reservoir.

* * * * *